(12) United States Patent
Lee (10) Patent No.: US 10,160,866 B2
(45) Date of Patent: Dec. 25, 2018

(54) VAPOR CORROSION INHIBITOR AND METHODS FOR USING SAME

(71) Applicant: Clifford Lee, New Braunfels, TX (US)

(72) Inventor: Clifford Lee, New Braunfels, TX (US)

( * ) Notice: Subject to any disclaimer, the term of this patent is extended or adjusted under 35 U.S.C. 154(b) by 0 days.

(21) Appl. No.: 15/320,684

(22) PCT Filed: Jun. 22, 2015

(86) PCT No.: PCT/US2015/036978
§ 371 (c)(1),
(2) Date: Dec. 23, 2015

(87) PCT Pub. No.: WO2015/196197
PCT Pub. Date: Dec. 23, 2015

(65) Prior Publication Data
US 2017/0198153 A1    Jul. 13, 2017

Related U.S. Application Data (60) Provisional application No. 62/015,127, filed on Jun. 20, 2014.

(51) Int. Cl.
| | |
|---|---|
| *C09D 5/08* | (2006.01) |
| *C23F 11/02* | (2006.01) |
| *B65D 1/02* | (2006.01) |
| *C04B 18/24* | (2006.01) |
| *C04B 28/02* | (2006.01) |
| *B05B 11/00* | (2006.01) |
| *C04B 103/61* | (2006.01) |

(52) U.S. Cl.
CPC ............... *C09D 5/082* (2013.01); *B65D 1/02* (2013.01); *C04B 18/24* (2013.01); *C04B 28/02* (2013.01); *C23F 11/02* (2013.01); *B05B 11/00* (2013.01); *C04B 2103/61* (2013.01)

(58) Field of Classification Search
CPC ......... C09D 5/082; C23F 11/02; C04B 28/02; C04B 18/24; C04B 2103/61; B65D 1/02; B05B 11/00
See application file for complete search history.

(56) References Cited

U.S. PATENT DOCUMENTS

| | | | | |
|---|---|---|---|---|
| 2,668,748 A | * | 2/1954 | Asbury | C10K 1/143 252/180 |
| 5,894,040 A | * | 4/1999 | Foley | B32B 27/10 252/389.54 |
| 2009/0020621 A1 | * | 1/2009 | Clark | B05B 1/14 239/8 |
| 2011/0260443 A1 | * | 10/2011 | Lyublinski | C23F 11/00 285/55 |
| 2015/0368808 A1 | * | 12/2015 | Lee | C23F 11/02 428/305.5 |

FOREIGN PATENT DOCUMENTS

| | | | |
|---|---|---|---|
| EP | 305393 B1 | * | 5/1992 |
| GB | 2248612 A | * | 4/1992 |

* cited by examiner

*Primary Examiner* — Anthony J Green
(74) *Attorney, Agent, or Firm* — Jackson Walker LLP (57) ABSTRACT

The present invention relates to a formula for an improved, volatile vapor corrosion inhibitor (VCI), and methods for using the VCI. More particularly, it relates to a fluid composition, and applications for the fluid composition, that inhibits corrosion and tarnishing and that is relatively non-toxic.

8 Claims, 6 Drawing Sheets

VAPOR CORROSION INHIBITOR AND METHODS FOR USING SAME

BACKGROUND OF THE INVENTION

Field of the Invention

Applicants' invention relates to a formula for an improved, volatile vapor corrosion inhibitor (VCI), and method for the use of same. More particularly, it relates to a fluid composition, and applications for the fluid composition, that inhibits corrosion and tarnishing and that is relatively non-toxic.

Background Information

Corrosion affects metal (as used herein, "metal" refers to both pure metals and metal alloys) adversely and is a serious problem for both public and private sectors. Corrosion can affect the usefulness of an object and cause the object to need to be repaired or replaced. Either consequence affects the user's time and cost. Consequently, there have been numerous attempts to find ways to combat corrosion. Two of the main avenues have been permanent coatings and temporary corrosion inhibitors.

VCI are well known in the industry. They emit a vapor intended to fill an enclosed space and coat the metal surfaces of articles in the space to inhibit corrosion of the surfaces, and/or blend with moisture and oxygen in the space to neutralize the primary components (i.e., moisture and oxygen) that cause corrosion.

Conventional corrosion inhibitors are chemical compounds that decrease the corrosion rate of metal. Generally, the corrosion inhibitor creates a layer or forms a coating on the metal surface that acts to reduce oxidation of the metal by reducing the contact, or access, that the oxidizing agent has to the metal surface. It should be noted that the term "corrosion inhibitor" is not intended to apply to permanent coatings or layers that are applied to the metal, but rather the corrosion inhibitor is placed in the atmosphere near or adjacent to the metal such that the corrosion inhibitor can migrate to and coat or adsorb the metal surface with an atomic or polyatomic layer.

Common corrosion inhibitors designed to reduce oxidation-type corrosion are corrosion inhibiting chemicals including: sodium nitrite, chromates, silicates, borates, zinc compounds, phosphates of various types, azole compounds, and generally reductive inhibitors such as amines and hydrazines. Such corrosion inhibitors chemically can combine with oxygen to form other compounds so that the oxygen does not react with the metal, prevent the oxygen from interacting with the metal, or otherwise prevent or slow oxidative reactions. However, as chemical reactions continue to occur with oxygen, the corrosion inhibitor will eventually be depleted and the inhibition will be terminated. Or, in the case of oils that create a barrier, degrade and become ineffective over time. Thus, corrosion inhibitors tend to be temporary in nature. However, the corrosion inhibitor is continually released, can be reintroduced, into the metal's environment in order to maintain or reinstitute the anti-corrosive action.

If the corrosion inhibitor is volatile, then it is of a type that is vaporized (or vaporizes) at normal temperatures so that it can travel through a confined space to coat the metal surface. The VCI vaporizes and carries, chemically or ionically bonded to the volatile molecule, the anti-corrosive agent. Thus, as the volatile compound vaporizes, the electrically charged reactant is carried with the volatile compound. If the VCI is in a relatively enclosed airspace that includes the metal surface to be protected, then the VCI will come to an equilibrium in the airspace and the metal surface will be "coated" with the corrosion inhibitor.

SUMMARY OF THE INVENTION

The present invention is an improved VCI using non-toxic compounds that is designed to protect all commonly used metals from rust, tarnish, and corrosion. The improved VCI, upon vaporization, inhibits surface corrosion caused by normal atmospheric oxygenation and reduction on metal surfaces. The improved VCI has a volatile compound, or carrier, derived from a plant or plants within the Amaryllidaceae or Fabaceae plant families and a corrosion inhibitor that may be based upon derived from a plant or plants within the Amaryllidaceae or Fabaceae plant families as well.

The improved VCI is not a contact protectant nor a desiccant, rather it comes to an equilibrium in the limited atmosphere of the container and protects the interior of the container and its metallic contents against corrosion regardless of natural environmental conditions acting in the container.

The composition of the improved VCI of the present invention is environmentally friendly, safe, nontoxic, and effective at reducing corrosion. It is derived from completely natural, organic sources. It is bio-degradable and can be recycled. It is anticipated that the emitting substrate may be recycled paper. With an application to an emitting substrate, an enclosed environment can be rendered safe from corrosion to a variety of metallic objects, such as firearms, tackle, tools, jewelry, parts, instruments, and electronic circuits. The emitting substrate can be customized with text and color graphics in order to enhance the visual appeal without affecting the efficacy of the improved VCI.

The improved VCI impregnated emitting substrate is placed in a container with the items that are intended to be protected from corrosion. Upon closing the container with the items inside, the improved VCI volatizes or diffuses creating an atmosphere of bipolar ionic shielding atoms that adsorb onto all metal surfaces inside and out wherever air can reach, forming an invisible layer of protection on all metallic surfaces even in the smallest holes and intricacies that standard methods of rust prevention cannot reach. Once the chemistry is applied and the container closed no further attention is required until it is opened again. If the improved VCI is still at an adequate level on the emitting substrate, then after the container is reclosed, the levels of improved VCI will return to protective amounts in the enclosed atmosphere. Or, the improved VCI can be reapplied to the emitting substrate.

When introduced into a contained atmosphere, the improved VCI coats all metals in an enclosed space with a molecular layer that inhibits corrosion and oxidation, however, when the improved VCI is used with an emitting substrate there is no discernible residue placed upon components near the substrate due to the dispersal of the improved VCI. The improved VCI is not a desiccant designed to absorb water, so it is not necessary to place a relatively large bag of desiccant in the container, nor continually re-dry the desiccant.

The improved VCI is used to protect all metals and electronic parts from rust and corrosion during shipment, storage and use, and does not require special cleaning or treatment of the metal pieces to be protected before use.

The improved VCI is intended to be employed in varying concentrations depending on the intended application. It is anticipated that the improved VCI will be deployed and used in a number of modalities, including but not limited to:

1) the improved VCI may be applied to a substrate of paper during paper post manufacturing process, paper is then segmented and used as a metal corrosion inhibitor when placed with goods in a near hermetically sealed shipping and storage package;

2) the improved VCI may be sprayed through semi-permeable membrane or porous layer to soak a thick, adhesive backed card or other substrate utilizing an improved VCI filled applicator container so as to replenish invention as directed, the applicator container is anticipated to be a spray bottle, liquid dropper, contact applicator, or the like;

3) the improved VCI may be used as an additive mixture to fluids, solutions, or slurries such as concrete for the purpose of inhibiting corrosion of encased, submerged, emerging, or emerged metals;

4) the improved VCI may be diffused into the atmosphere of the target metal requiring corrosion inhibition either directly via spray atomizer or via a combination of invention filled reservoir and diffuser device;

5) the improved VCI may be added inside various instrument enclosures, including without limitation: a Computer Numerical Control (CNC) machine or the interior of boating electronic components.

9) the improved VCI may be added to compatible cleansers that are used on metallic objects.

DETAILED DESCRIPTION OF THE PREFERRED EMBODIMENT

Figure 1:
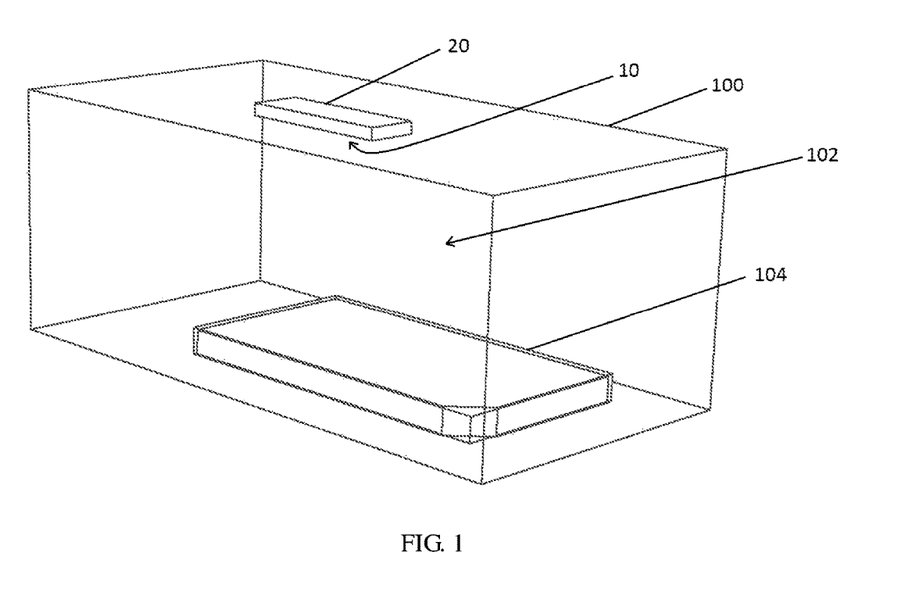
FIG. 1 is a perspective view of an enclosed environment illustrating the use of the present invention.

Referring to the figures, FIG. 1 illustrates how the improved VCI 10 inhibits corrosion. The improved VCI 10 uses a volatile compound, or carrier, derived from a plant or plants within the Amaryllidaceae plant family to cause vaporization. Volatility is due generally to phenols in the compound. Natural phenols such as found in the Amaryllidaceae plant family, can chemically interact with many other substances in the form of stacking. "Stacking" refers to attractive, non-covalent interactions between aromatic rings. Thus, as the compound vaporizes, it can interact with, and take other molecules with anti-corrosive properties. These anti-corrosive properties are in the form of an ionic bond formed with oxygen molecules. As oxygen molecules are thus engaged, they are not available to cause oxidation, or corrosion of the metallic object. An emitting substrate 20, which is loaded with the improved VCI 10 is placed in a container 100. As used herein, "loaded" is intended to mean that some amount of the improved VCI 10 is contained on or in the emitting substrate 20, thus the emitting substrate 20 may be impregnated, saturated, partially saturated, or otherwise hold the improved VCI 10. Anti-corrosive ions (not shown) of the improved VCI 10 are carried into the gaseous phase with the carrier as a vapor. This vapor will come to an equilibrium that fills the interior 102 of the container 100. It is anticipated that varying sizes of emitting substrates 20 and amounts of improved VCI 10 will be used in conjunction with varying volumes of container 100 interiors 102. The vapor is intended to fill the interior 102 and coat the metal surfaces of articles 104 in the interior 102 to inhibit corrosion and oxidation. The improved VCI 10 inhibits corrosion of the surfaces 104, and/or blend with moisture and oxygen in the interior 102 to neutralize the primary components (i.e., moisture and oxygen) that cause corrosion.

The emitting substrate 20 inside a container 100 that has a hollow interior space 102. Improved VCI 10 is loaded on the emitting substrate 20. Over time, the improved VCI 10 vaporizes emitting improved VCI 10 ions (not shown) into the interior 102 of the container 100. These ions (not shown) come to an equilibrium filling (if there is sufficient amount of improved VCI 10 loaded on the emitting substrate 20) the interior 102. The ions (not shown) come in contact with a metallic object 104 in the interior 102. A layer of the ions (not shown) coats the metallic object 104 which inhibits corrosion of the metallic object 104.

Dissolved, or vaporized, ions (not shown) from the improved VCI 10 in the emitting substrate 20 enter into a gaseous phase. Some of these ions (not shown) bond with the object 104, and form an ionic layer on the object 104. This layer on the metallic object 104 of the improved VCI 10 acts as an anti-corrosive.

It is anticipated that the interior 102 may not be sealed from the outside environment. This may occur if the container 100 is temporarily opened, or if the container has apertures or is otherwise permeable to the outside environment. In these cases, objects 104 remaining in the container 100 after the container 100 is opened will be protected from corrosion if sufficient improved VCI 10 remains on the emitting substrate 20 such the corrosion inhibiting ion vapor again develops in the container 100 after it is closed. In the instance in which a container 100 has a more permanent aperture, then improved VCI 10 ions (not shown) will continually be dispersed into the atmosphere and lost to the outside environment. The improved VCI 10 will continue vaporizing from the emitting substrate 20, so ions (not shown) will continue to protect the object 104 from oxidation until to many ions (not shown) are lost to the outside environment.

Figure 2:
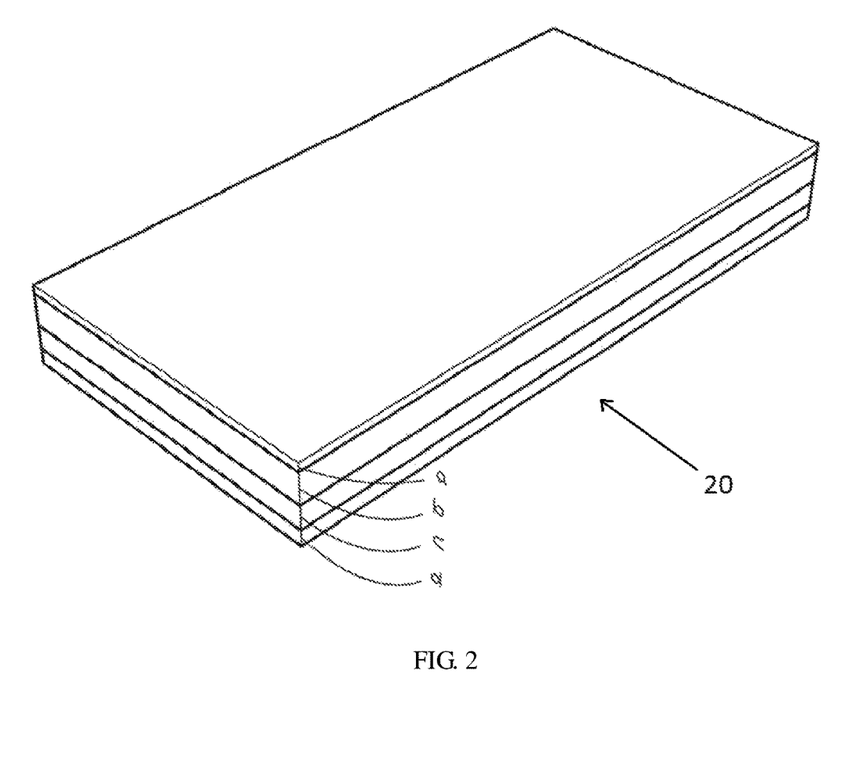
FIG. 2 is a perspective view of a card as an embodiment of an emitting substrate.

FIG. 2 illustrates a card which could be used as an emitting substrate 20. In a first embodiment of use, the improved VCI is applied to a porous or fibrous emitting substrate 20, not directly to the metal 104 meant to be protected. It is anticipated that the emitting substrate 20 may be a sheet of paper or cardstock. The improved VCI 10 is held in solution in an applicator container 30 such as a spray bottle. The emitting substrate 20 is coated on one (1) or both sides with the improved VCI 10. It is anticipated that the improved VCI 10 will not absorb moisture like a desiccant. Rather, it 10 emits ions (not shown) into an enclosed environment 102. Ions (not shown) fill the container with anti-corrosive protection, keeping even the smallest piece of metal 104 coated and corrosion free. There is no need to clean the object 104 prior to use. Emitting substrates 20 may be fibrous products, without limitation, such as paper, cloth sheets, wood pulp, fiberboard, or paperboard chips.

The emitting substrate 20 could take the form of a printed paper. The printing will not affect the emitting substrate 20 and improved VCI 10 as a whole. Therefore, it is anticipated that marketing materials such as a business card could be printed, distributed with a spray bottle 30 filled with the improved VCI 10. An advertiser would give the emitting substrate/marketing material 20 to a client/customer, or potential client/customer. Because the emitting substrate/marketing material 20 would be more useful than ordinary marketing materials, the client would be enticed to use the emitting substrate/marketing material 20 and spray bottle 30 in protecting some personal metallic object 104 and thus be repeatedly reminded of the advertiser.

Figure 3:
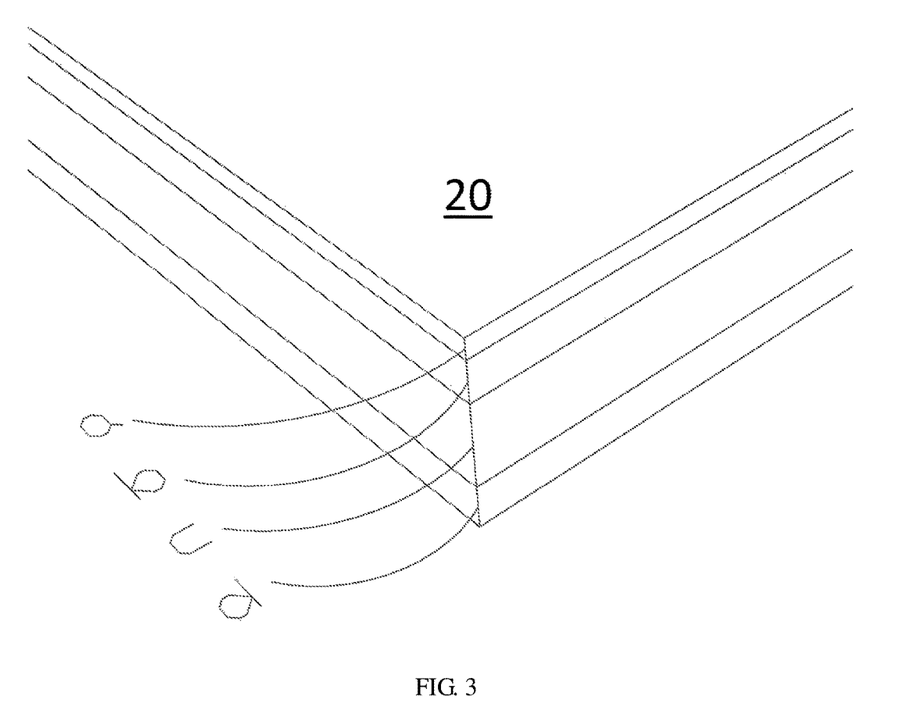
FIG. 3 is a partial, perspective view of a card as an embodiment of an emitting substrate.

The card, emitting substrate 20 may have layers in order to more effectively act to diffuse the improved VCI 10. The card, emitting substrate 20 may have a semi-permeable surface 20a. It is anticipated that the semi-permeable surface 20a would be able to accept printing in order to provide users with options as to the appearance of the card, emitting substrate 20. In order to maximize the amount of improved VCI 10 held by the card 20, the card 20 may have an absorbent layer 20b. If the card 20 were made from simply paper, the paper would act as the absorbent layer 20b. However, in an improved card 20 the absorbent layer 20b would be made from porous material specifically chosen to act similarly to a sponge with pores and channels allowing the improved VCI 10 to be held. Although not necessary, it is also anticipated that the card 20 could include a non-permeable layer 20c. The non-permeable layer 20c would direct vaporization of the improved VCI 10 directionally out through the semi-permeable layer 20a. Another anticipated layer is an adhesive or magnetic layer 20d. Such a layer could be used to attach the card 20 to a chosen position in the container 100.

FIG. 3 illustrates the layers that might be included in the card, emitting substrate 20. In a second embodiment of use in which the improved VCI 10 is sprayed through semi-permeable membrane 20a to soak an emitting substrate 20, where the emitting substrate 20 is adhesive backed 20d. The adhesive could be used to place the emitting substrate 20 in a position strategically chosen to more efficiently deploy the improved VCI 10 ions (not shown) near an object 104 that a user wishes to protect from corrosion. The user may utilize an improved VCI 10 filled applicator container 30 so as to replenish the improved VCI 10 loaded on the emitting substrate 20. The applicator container 30 is anticipated to be a spray bottle, liquid dropper, contact applicator, or the like.

Figure 4:
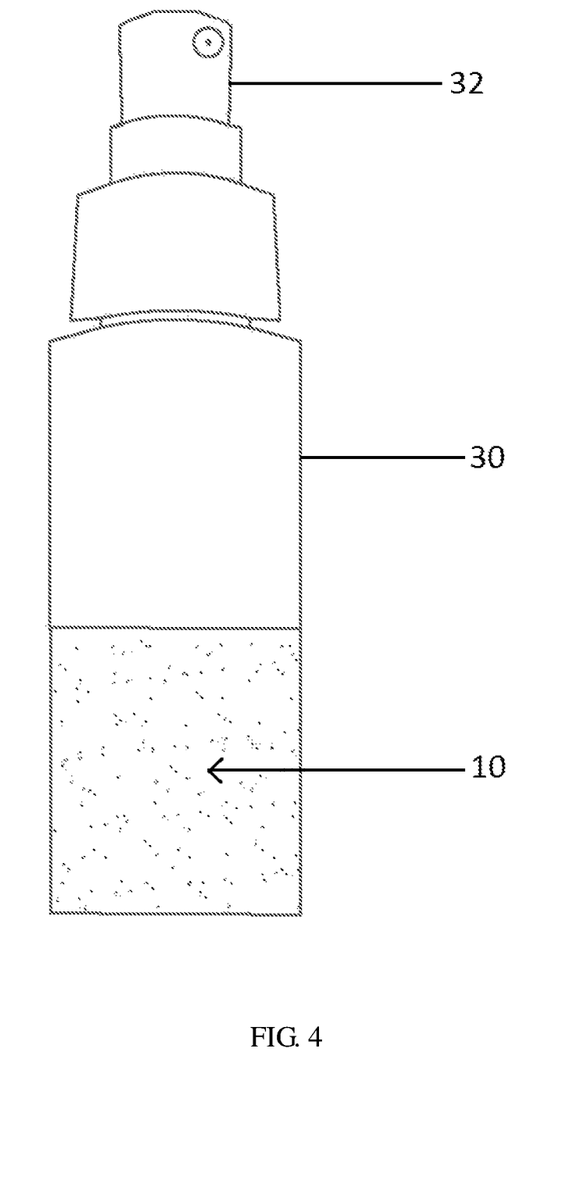
FIG. 4 is a perspective view spray bottle as an embodiment of an applicator container.

FIG. 4 shows a spray bottle as an applicator container 30. The spray bottle 30 is used to spray improved VCI 10 onto absorbent substrata. The improved VCI 10 could easily be contained and applied the other spray mechanism 32.

Figure 5:
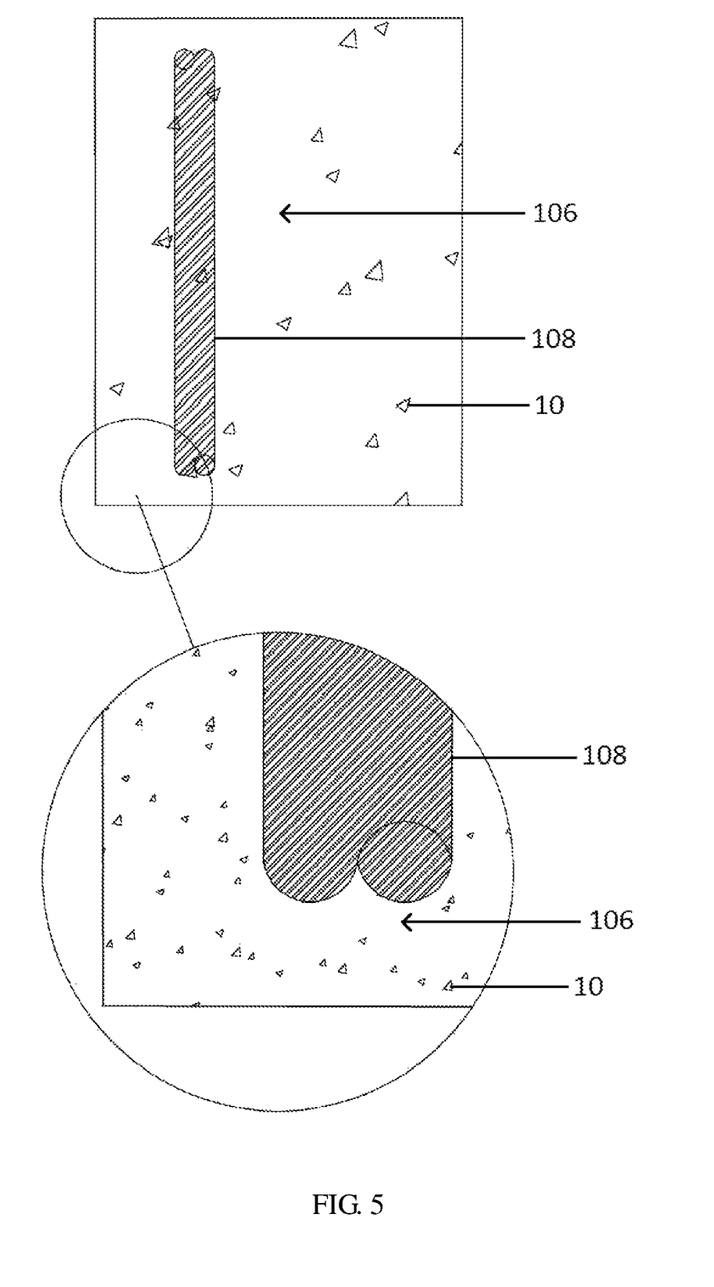
FIG. 5 is a schematic illustrating how the improved VCI inhibits corrosion in a solid slurry such as concrete.

FIG. 5 illustrates a third embodiment of use in which the improved VCI 10 is used as an additive mixture to fluids, solutions, or slurries 106 such as concrete 106 for the purpose of inhibiting corrosion of encased, submerged, emerging, or emerged metals 108. For example, rebar 108 is set in concrete 106 structures and used as a tension device in reinforced concrete 106 and masonry 106 structures, to strengthen and hold the concrete 106 in compression. Over time, the rebar 108 can corrode and lose strength. The improved VCI 10 in the concrete 106 acts to protect the rebar 108 from corrosion.

Figure 6:
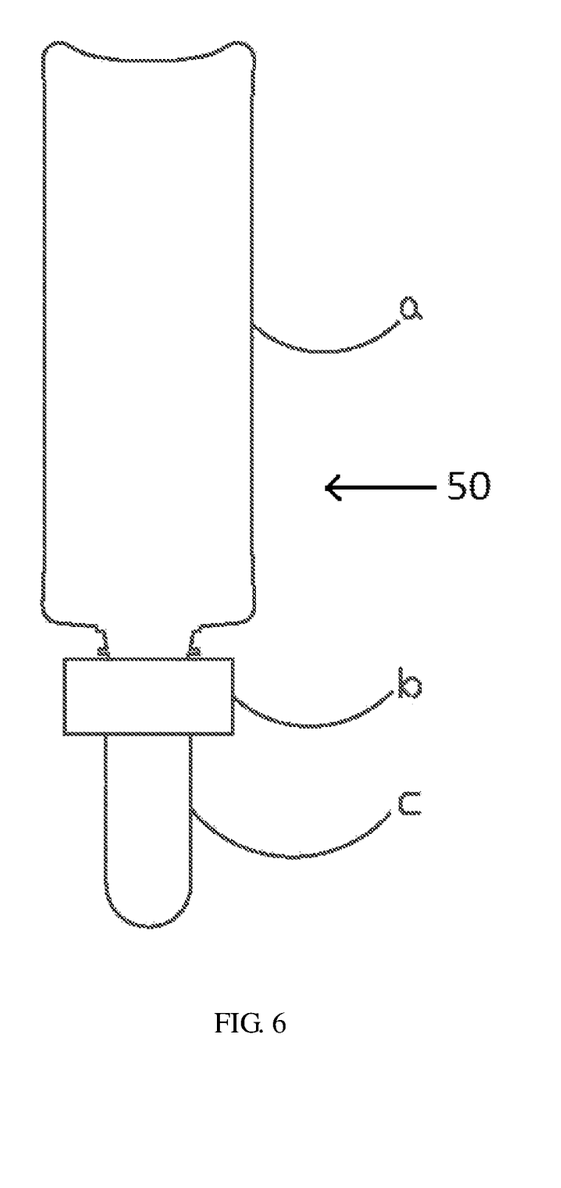
FIG. 6 is a perspective view of a diffuser bottle as an embodiment of an applicator container.

FIG. 6 illustrates a fourth embodiment of use in which the improved VCI 10 is diffused into the atmosphere 102 of the target metal 104 requiring corrosion inhibition either actively via a powered spray atomizer or passively via evaporation using a combination of an improved VCI 10 filled reservoir 50a and a diffuser 50c. In this embodiment, a reservoir 50 of the improved VCI 10 is placed in a container 104. It is desired that the improved VCI 10 be vaporized into the container 100 interior 102. The reservoir 50 would hold the improved VCI 10 and attached diffuser adapter 50b and attached diffuser 50c. The diffuser adapter 50b and diffuser 50c would allow the improved VCI 10 to pass through an vaporized into the atmosphere. A powered spray atomizer 50 acts to help vaporize the improved VCI 10 directly into the air. Using a reservoir 50 is useful when more of the improved VCI 10 is needed, such as for larger interiors 102 or for longer time periods of anti-corrosion protection.

In a fifth embodiment of use, the improved VCI is added into an internal space of instrument and electronics enclosures, such as a Computer Numerical Control (CNC) machine. CNC machines are widely used for product production. They include both tooling mechanisms and computer control mechanisms. By introducing the improved VCI 10 into the interior of the CNC, all metallic components are protected from corrosion.

In a sixth embodiment of use, the improved VCI is added to the interior of boating electronic components. Because of the high humidity that components used in boats are forced to operate in, corrosion is a particular problem. The improved VCI 10 put in operative communication with the components can alleviate that problem.

In an seventh embodiment of use, the improved VCI is added to the interior of electronic components. For example, the improved VCI 10 may be placed in the housing of a computer or computer system packaging. It is anticipated that there are numerous electronic systems into which the improved VCI 10 may be placed and put into operative communication with, in order to provide corrosion protection for metallic and other oxidative susceptible components.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A volatile vapor corrosion inhibitor comprising:
   a solution containing a volatile compound derived from a plant or plants within the Amaryllidaceae plant family and a corrosion inhibitor; and
   wherein said solution is nontoxic.

2. The volatile vapor corrosion inhibitor of claim 1, further comprising an applicator bottle containing said volatile vapor corrosion inhibitor.

3. The volatile vapor corrosion inhibitor of claim 2, wherein said bottle is a spray bottle.

4. The volatile vapor corrosion inhibitor of claim 2, further comprising an emitting substrate wherein said volatile vapor corrosion inhibitor may be deposited on said emitting substrate using said spray bottle.

5. The volatile vapor corrosion inhibitor of claim 1, wherein said volatile vapor corrosion inhibitor is mixed with a cement slurry.

6. The volatile vapor corrosion inhibitor of claim 1, wherein said solution is bio-degradable.

7. The volatile vapor corrosion inhibitor of claim 6, wherein said solution is contained inside a spray bottle.

8. The volatile vapor corrosion inhibitor of claim 7, further comprising an emitting substrate wherein said volatile vapor corrosion inhibitor may be deposited on said emitting substrate using said spray bottle.

* * * * *